Dec. 8, 1964 R. M. WILMOTTE 3,160,859

OPTICAL INFORMATION STORAGE AND READOUT CIRCUITS

Filed Nov. 30, 1959

INVENTOR
Raymond M. Wilmotte
BY Pains Haskell + Levine
ATTORNEYS

United States Patent Office 3,160,859

Patented Dec. 8, 1964

3,160,859

OPTICAL INFORMATION STORAGE AND READOUT CIRCUITS

Raymond M. Wilmotte, Princeton, N.J.
(4301 Massachusetts Ave. NW., Washington, D.C.)

Filed Nov. 30, 1959, Ser. No. 856,076
16 Claims. (Cl. 340—173)

The present invention relates broadly to the field of data handling, and more particularly to information storage or memory circuits with readout means that are adapted automatically to reset or clear the memory circuits conjointly with the readout operation The present invention is a continuation-in-part of my copending application, S.N. 620,831, filed November 7, 1956, entitled Counters.

In the art of data handling, there are numerous situations where it is desired to ascertain whether or not over a period of time a specified function, or a plurality of such functions, or conditions, have occurred. Elementary examples may be found in the arts of telemetering and automation, for example, where the sensing circuits or instruments may be designed to provide output pulses upon the occurrence of specified conditions, and it may be desired to know whether such conditions have occurred within a specified time interval. The time interval may, of course, be short and the interrogation may be repetitive, that is follow each successive interval. For this purpose, the system may provide a communication channel for each condition in question, leading to a memory circuit responsive to output pulses denotative of the occurrence of such condition. The memory circuit stores the pulse until interrogated for the presence or absence of such pulses, and the interrogation operation reads out the presence or absence of a stored pulse. Whereupon the memory circuit is reset in readiness to store a pulse or signal again should one occur during the succeeding time interval to the next interrogation.

The present invention relates to circuits adapted to perform the foregoing functions of storing an input signal, reading out the condition of the storage unit in response to an interrogation input, and automatically resetting the memory unit to starting condition in response to the interrogation input. In particular, the circuits of the present invention are at least in part optical-electronic circuits utilizing combinations of voltage responsive light sources and photoresponsive electrical devices, optically coupled with the light sources. In the preferred embodiments of the present invention the light sources are electroluminescent cells, and the photoresponsive devices are photoconductors, although the scope of the invention is obviously not limited to these specific devices.

Electroluminescent cells are well known and are generally analogous to capacitors. They may comprise a phosphor material such as zinc sulfide, which possesses the property of luminescing when exposed to a varying electrical field in excess of a threshold voltage and frequency for the particular cell. The phosphor material may be dispersed and embedded in a dielectric vehicle such as a plastic sheet, which in turn is sandwiched between two conductive electrode layers to which the electrical field generating signal is applied. In order to facilitate light emission from the cell, the dielectric vehicle and at least one of the electrode layers is made transparent. Photoconductors are also well known, and these may be in the form of cadmium sulfide crystals.

It is accordingly one object of the present invention to provide electrical memory circuits with readout means combined therewith, and wherein the operation of the readout means automatically functions to reset the memory circuit.

Another object of the present invention is to provide such circuits utilizing optical-electronic components.

Still another object of the present invention is to provide such circuits wherein the optical-electronic components comprise electroluminescent cells or capacitors as light sources and photoconductors as the photoresponsive electrical elements.

Other objects and advantages of the present invention will become apparent to those skilled in the art from a consideration of the following detailed description of several exemplary embodiments of the present invention, had in conjunction with the accompanying drawings, in which like numerals refer to like or corresponding parts and wherein.

Figure 1:
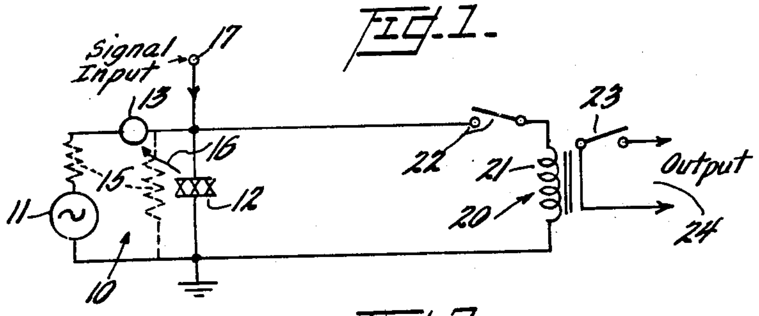
FIG. 1 is a circuit diagram of one embodiment of the present invention.

The simplest embodiment of the present invention is shown in FIG. 1, wherein the memory or storage circuit 10 comprises the A.C. bias voltage source 11 connected across the electroluminescent capacitor or cell 12, with a photoconductor 13 in electrical series therewith. If desired, the resistor 15 shown in dotted lines may be provided to assist in attaining the parameters desired as will become apparent to those skilled in the art. As designated by the arrow 16, cell 12 is optically coupled to photoconductor 13, i.e. the light output of cell 12 is used to illuminate photoconductor 13. A signal input circuit 17 is also connected across cell 12. The storage circuit thus far described is designed to provide the characteristics of a first stable state with cell 12 nonluminant. In other words the voltage of the bias source 11, the impedances of the photoconductor 13 and resistor 15 and the impedance of the cell 12 are chosen that without further excitation the voltage from bias source 11 applied across cell 12 is not sufficient to cause any appreciable luminescence of cell 12.

However, when an input signal of sufficient magnitude is momentarily applied to input 17 and hence across cell 12, this cell is caused to luminesce in response thereto, in turn illuminating photoconductor 13. The magnitude and duration of the input signal is chosen to provide sufficient illumination of photoconductor 13 to reduce its impedance to the point where the voltage developed across cell 12 from bias source 11 alone is sufficient to cause the cell to luminesce. At this point, the input signal may terminate, but the low impedance of photoconductor 13 enables cell 12 to continue to luminesce under excitation from source 11, and the luminescence of cell 12 in turn maintains photoconductor 13 at this low impedance level. Thus, the occurrence of an input signal 17 has been noted and stored in the memory circuit 10, by means of the change in state of cell 12 to a second or luminescing stable state.

The readout and reset circuit is generally designated by the numeral 20. A low impedance coil 21 is connected across the cell 12 with an appropriate switching means, such as switch 22 interposed in the coil circuit. This switch is normally biased open. Coil 21 is part of a relay including switch 23, which may be normally biased open, in output circuit 24.

Thus, if the condition of the memory circuit 10 is such that cell 12 is non-luminant and photoconductor 13 is a high impedance, interrogation of memory circuit 10 by closure of readout switch 22 will cause very little current to flow in coil 21, and switch 23 will remain open. Therefore, no change or signal will be sensed in the output circuit 24. However, if cell 12 is luminant, indicative of the fact that an input signal had been previously applied to input 17, photoconductor 13 is thus placed in a relatively low impedance state. Upon interrogation of the memory circuit by closure of switch 22, a significant amount of current is caused to flow in coil 21, closing relay switch 23 to produce a change in output circuit 24. The period of this significant current flow in coil 21 and consequent closure of relay switch 23 is of short duration, because the closure of interrogation switch 22 shunts the cell 12 through coil 21, thereby extinguishing the cell. Photoconductor 13 being no longer illuminated, rises to its high impedance state so the current in coil 21 is insufficient to hold relay switch 23 closed, and it opens. Memory circuit 10 having thus been returned to its original stable state, interrogation switch 22 is opened, and the voltage from source 11 is insufficient to cause cell 12 to luminesce, because of the return of photoconductor 13 to its high impedance state. The interrogation operation of switch 22 may of course be effected by any suitable means, such as a person, or a mechanical device such as a cam operated by a timer, or an electromechanical device, such as a relay operated by a timer.

Thus, in accordance with the foregoing description, the circuit of FIG. 1 operates to store the occurrence of an input signal applied at 17, and this information can be read out electrically by closure of interrogation switch 22, which operation also functions to reset the memory or storage circuit 10 in readiness to record the next occurrence of an input signal applied at 17.

Figure 2:
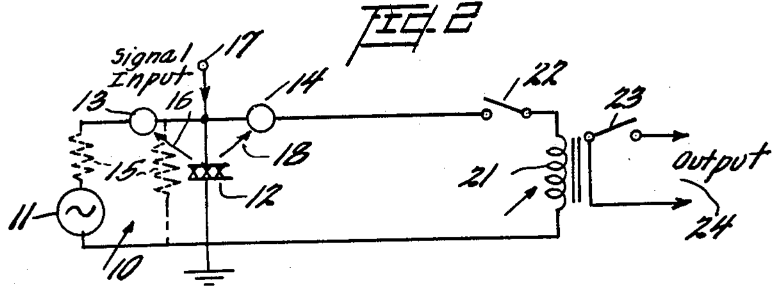
FIG. 2 is a circuit diagram of a modification of the embodiment shown in FIG. 1.

A modification of the circuit of FIG. 1 is shown in FIG. 2. It includes the memory circuit 10, comprising elements 11, 12, 13, 15 and 17, identical to the memory circuit of FIG. 1, and the readout circuit 20, comprising the elements 21, 22, 23 and 24, identical to the readout circuit of FIG. 1. In addition, FIG. 2 includes the additional photoconductor 14 in electrical series with the readout coil 21 and in parallel with the cell 12. Cell 12 is luminance coupled to photoconductor 14 as indicated by the arrow 18. Thus the photoconductors 13 and 14 provide a voltage divider with cell 12 tapped intermediate these two elements.

The dual photoconductors operate to enhance the operation of the circuit previously described, in that the second photoconductor 14, when not illuminated, functions to further isolate coil 21 from source 11, upon interrogation of the memory circuit by closure of switch 22. Also, in order that the shunt path across cell 12 when luminant shall be low in impedance, the photoconductor 14 is designed to provide a very low impedance when illuminated by cell 12, and substantially lower than the illuminated impedance of photoconductor 13, so that cell 12 will become extinguished on closure of switch 22. This latter relationship can be readily accomplished by utilizing photoconductors of different characteristics, or by more closely optically coupling photoconductor 14 to cell 12 than is done with photoconductor 13.

Figure 3:
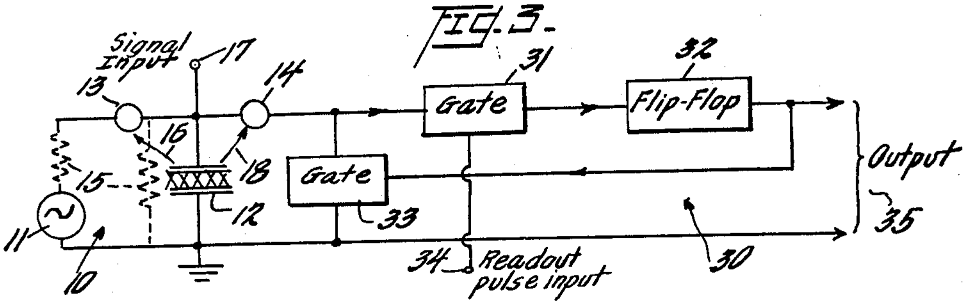
FIG. 3 is a circuit diagram of another embodiment of the invention.

Another embodiment of the invention is shown in FIG. 3, disclosing a different readout and reset circuit 30. The memory or storage circuit 10, comprising the elements 11, 12, 13, 14, 15 and 17, is identical to the memory circuit 10 of FIG. 2. An output from the memory circuit 10 is obtained across a normally high impedance gate 33, which output is a function of the impedance state of photoconductors 13 and 14, controlled by cell 12, as previously explained. The memory circuit output is also applied as one input to gating circuit 31. If a signal has been received at input 17, cell 12 is luminant and the output of circuit 10 across gate 33 is relatively high; however, if no signal has been received at 17, cell 12 is non-luminant, and the output of storage circuit 10 across gate 33 is relatively low.

The interrogation function in this circuit is performed by applying a readout pulse to gating circuit 31 through readout input 34. A relatively high output voltage existing across gate 33 at the time of application of a readout pulse to gating circuit 31, causes gate 31 to pass a signal to a switching circuit 32, which may be a flip-flop, delay multivibrator, or the like, resulting in an output signal at 35. The output signal at 35 indicates that the memory circuit 10 had received an input signal prior to interrogation by application of the readout pulse to input 34. The output signal from the switching circuit 32 is fed back to gate 33, causing it to change from a relatively high impedance to relatively low impedance. This change shunts cell 12, causing it to become extinguished and pohtoconductors 13 and 14 to return to their high impedance state, thereby resetting the memory circuit. On the other hand, if at the time of application of the readout pulse no input signal had been received by the memory circuit, cell 12 would be in a non-luminant state and photoconductors 13 and 14 would be in a high impedance state, resulting in a relatively low voltage across gate 33. Under these conditions, the application of a readout pulse to gating circuit 31 would not pass a signal to the switching circuit 32, and no signal would be obtained at output 35.

Figure 4:
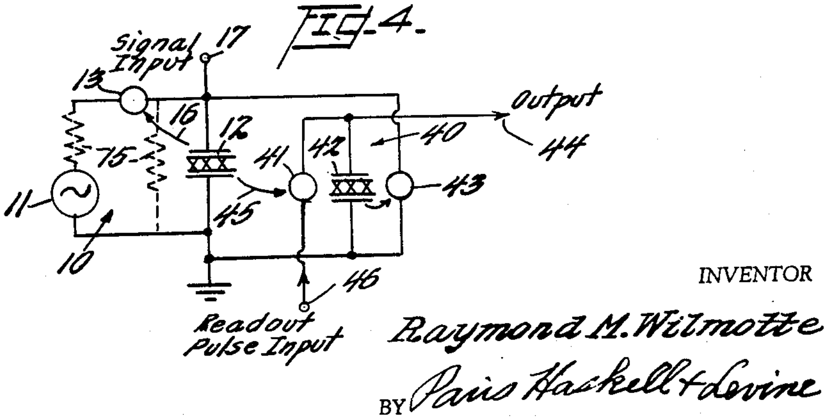
FIG. 4 is a circuit diagram of still another embodiment of the invention.

In FIG. 4 still another embodiment of the readout and reset circuit is shown. Here, the memory circuit 10 is identical to that shown in FIG. 1, and comprises the elements 11, 12, 13, 15 and 17. The readout circuit 40 includes a photoconductor 41 optically coupled to cell 12, as indicated by the arrow 45. Thus, if an input signal has been received at the time of readout, photoconductor 41 is a relatively low impedance due to illumination by cell 12. Hence, a readout pulse applied at readout input 46 will be passed to output 44. However, if no input signal has been received by the memory circuit 10 at the time of readout, cell 12 is non-luminant, hence photoconductor 41 is a relatively high impedance, and consequently essentially no output pulse is obtained at 44 when a read out pulse is applied to readout input 46.

If at the time of readout cell 12 is luminant, indicating that memory circuit 10 has recieved an input signal, the readout pulse passed by the illuminated low impedance photoconductor 41 is chosen to be of sufficient value to cause cell 42 to luminesce. Electroluminescent cell 42 is optically coupled to photoconductor 42 and the latter is electrically connected across memory circuit cell 12. Thus, the luminescence of cell 42 and resultant low impedance of photoconductor 42 shunts cell 12 to extinguish the same, resulting in a return of photoconductors 13 and 41 to a high impedance state, thereby resetting the circuit into condition for detecting the next input signal applied to the memory circuit through input 17.

Since in the FIG. 4 embodiment the readout signal does not merely effect a triggering or switching function as in the FIG. 3 embodiment, but is per se passed to the readout output circuit. It is apparent that this readout signal may itself be modulated intelligently to carry the desired information into the readout output circuit.

There have thus been described several exemplary embodiments and modifications of the present invention, wherein there is provided an information memory or storage circuit, in combination with a readout means, wherein the operation of the readout automatically effects a resetting of the memory circuit into a condition suitable for detecting the next occurrence of an information signal. Various additional variations and modifications of the present invention will be apparent to those skilled in the art. Accordingly it is not intended that the present invention be construed as limited to the details of the present specific disclosure; for such variations and modifications as are embraced by the spirit and scope of the appended claims are contemplated as within the purview of the present invention.

What is claimed is:

1. A memory and readout circuit comprising a voltage responsive light source variable in luminance in response to the voltage applied thereto, a bias circuit for applying a bias voltage to said light source, photoresponsive means optically coupled to said source for effecting a variation in the electrical series impedance of said bias circuit relative to said light source in inverse relation to the luminance of said source, an input circuit for applying an input voltage signal to said light source, and a readout circuit including means connected across said light source having a relatively high and a relatively low impedance state, said readout circuit further including means responsive to the voltage across said light source, on signal input operation said high and low impedance state means being in the high impedance state to permit a relatively large voltage to develop across said light source, and in the low impedance state on readout operation to shunt said light source and means for switching the readout circuit between the signal input operation condition and the readout operation condition.

2. A memory and readout circuit as set forth in claim 1, wherein said high and low impedance state means is a switch means, and said readout circuit voltage responsive means is a relay means.

3. A memory and readout circuit as set forth in claim 2, wherein said relay means is an electromagnetic relay.

4. A memory and readout circuit as set forth in claim 3, wherein said switch means is a mechanical switch.

5. A memory and readout circuit as set forth in claim 2, wherein said relay means is an electronic relay means.

6. A memory and readout circuit as set forth in claim 5, wherein said electronic relay means includes an electronic gating means.

7. A memory circuit as set forth in claim 5, wherein said switch means is an electronic switching means.

8. A memory circuit as set forth in claim 7, wherein said electronic switching means includes an electronic gating means.

9. A memory and readout circuit as set forth in claim 2, wherein said relay means is an optical-electronic relay means.

10. A memory and readout circuit as set forth in claim 9, wherein said optical-electronic relay means includes a photoresponsive means optically coupled to said light source.

11. A memory and readout circuit as set forth in claim 9, wherein said switching means is an optical-electronic switching means.

12. A memory and readout circuit as set forth in claim 11, wherein said optical-electronic switching means includes a photoresponsive means connected across said light source, and a second voltage responsive light source, variable in luminance in response to the voltage applied thereto, in the output circuit.

13. A memory and readout circuit as set forth in claim 1, wherein said light source is an electroluminescent cell and said photoresponsive means is a photoconductor.

14. A memory and readout circuit comprising, a voltage responsive light source variable in luminance in response to the voltage applied thereto, a bias circuit for applying a bias voltage to said light source, photoresponsive means optically coupled to said source for effecting a variation in the electrical series impedance of said bias circuit relative to said light source in inverse relation to the luminance of said source, an input circuit for applying an input voltage signal to said light source, a readout circuit connected across said light source including relay means and an interrogation signal input means to said relay means for effecting a change in state at the output of the readout circuit in response to the simultaneous occurrence of a luminant state of said light source and an interrogation signal, and further including means having a normal relatively high and further haying a relatively low impedance state responsive to said change in state at the output of the readout circuit to obtain said low impedance state thereby to shunt said light source.

15. A memory and readout circuit as set forth in claim 14, wherein said relay means is an electronic gating circuit, and said means having relatively high and relatively low impedance states also is an electronic gating circuit.

16. A memory and readout circuit as set forth in claim 14, wherein said relay means is a photoresponsive means, and said high and low impedance means is a photoresponsive means optically coupled to a voltage responsive light source connected to the output of the readout circuit.

References Cited in the file of this patent

UNITED STATES PATENTS

| | | |
|---|---|---|
| 2,695,396 | Anderson | Nov. 23, 1954 |
| 2,907,001 | Loebner | Sept. 29, 1959 |